United States Patent
Fukuda et al.

(10) Patent No.: US 6,510,176 B1
(45) Date of Patent: Jan. 21, 2003

(54) VARIABLE-BIT-RATE CODING APPARATUS

(75) Inventors: Hideki Fukuda, Nara (JP); Kazuhiko Nakamura, Osaka (JP); Kojiro Kawasaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/404,257

(22) Filed: Sep. 22, 1999

(30) Foreign Application Priority Data

Sep. 29, 1998 (JP) .......................................... 10-274939

(51) Int. Cl.$^7$ ................................................. H04N 7/12
(52) U.S. Cl. ................................................. 375/240.02
(58) Field of Search ....................... 375/240.02, 240.03; 348/419.1; 382/239, 251; 358/261.2, 430; 386/27, 33, 109

(56) References Cited

U.S. PATENT DOCUMENTS

| | | | | |
|---|---|---|---|---|
| 5,231,484 A | * | 7/1993 | Gonzales et al. | 348/405 |
| 5,426,463 A | * | 6/1995 | Reininger et al. | 348/405 |
| 5,675,384 A | * | 10/1997 | Ramamurthy et al. | 348/405 |
| 5,790,745 A | * | 8/1998 | Sugiyama et al. | 386/111 |
| 5,929,916 A | * | 7/1999 | Legall et al. | 348/419 |
| 6,037,987 A | * | 3/2000 | Sethuraman | 348/415 |
| 6,055,270 A | * | 4/2000 | Ozkan et al. | 375/240 |
| 6,088,392 A | * | 7/2000 | Rosenberg | 375/240 |
| 6,167,087 A | * | 12/2000 | Kato | 375/240.03 |
| 6,192,154 B1 | * | 2/2001 | Rajagopalan et al. | 382/232 |
| 6,195,388 B1 | * | 2/2001 | Choi et al. | 375/240.05 |
| 6,212,232 B1 | * | 4/2001 | Reed et al. | 375/240.03 |
| 6,263,020 B1 | * | 7/2001 | Gardos et al. | 375/240.03 |

FOREIGN PATENT DOCUMENTS

| | | | | |
|---|---|---|---|---|
| JP | 8-149413 | 6/1996 | | H04N/7/12 |
| JP | 10-215460 | 8/1998 | | H04N/7/12 |

OTHER PUBLICATIONS

Choi et al., "A perceptual based rate control scheme for MPEG-2", ISCAS, vol. 5, pp. 546–549, 1998.*

Ng et al., "A modified H.263 algorithm using bit allocation buffer control algorithm", ISCAS, vol. 2, pp. 1389–1392, 1997.*

Ng et al., "Buffer control algorithm for low bit–rate video compression", Internationl Conf. on Image Processing, vol. 1, pp. 685–688, 1996.*

* cited by examiner

*Primary Examiner*—Vu Le
(74) *Attorney, Agent, or Firm*—Nixon Peabody LLP; Thomas W. Cole

(57) ABSTRACT

A cumulative error D is calculated by sequentially adding up errors, each representing a difference between a given average target number Ba and a number Bg of bits generated during every predetermined period of a coded bit stream. In determining a number Bt of bits allocated to a compression coder, a provisionally allocated bit number Bst is preset based on a coding complexity X such that a number of bits allocated to a scene with a high coding complexity exceeds the average target number Ba as for a frame just after the change of scenes. And if the cumulative error D exceeds a predetermined value, the provisionally allocated bit number Bst is corrected in accordance with the magnitude of the cumulative error D so as to be reducible to, but not less than, the average target number Ba. As for frames within the same scene on the other hand, a previously allocated bit number Bt is sequentially updated such that the cumulative error D does not exceed a predetermined maximum value Dmax. Accordingly, even if a series of scenes with high coding complexities X appear consecutively, a number Bt of bits allocated to each of these scenes can always be at least equal to the average target number Ba, while the total number of bits generated can also be regulated. As a result, high image quality is ensured.

15 Claims, 5 Drawing Sheets

VARIABLE-BIT-RATE CODING APPARATUS

BACKGROUND OF THE INVENTION

The present invention relates to a coding apparatus for converting a video signal into a coded bit stream by performing variable-bit-rate control in real time.

MPEG-2 is an international standard defining an exemplary method of compression-coding a video signal. According to the MPEG-2 standard, a highly compressed video of excellent quality is obtained by the following techniques. Specifically, an image on the screen is divided into a plurality of blocks. Each block consists of a plurality of pixels, and is subjected to discrete cosine transform (DCT). The resultant transform coefficients are subjected to quantization and then variable-length coded, thereby removing spatial redundancy. In addition, temporal redundancy can also be removed by performing intra-frame coding, inter-frame forward predictive coding with motion compensation and inter-frame bidirectional predictive coding in combination.

Generally speaking, any video is a mixture of scenes with relatively high coding complexities, e.g., a scene with a lot of motion or complex patterns, and scenes with relatively low coding complexities, e.g., a monotonous scene with little motion. If a sufficiently large number of bits are not allocated to a scene with a high coding complexity, then various types of noise unique to the DCT coding, e.g., block noise and mosquito noise, are generated, thus considerably deteriorating the resultant image quality.

Accordingly, to ensure high image quality by fixed-bit-rate control, coding needs to be performed at a high bit rate adapted to a scene with a high coding complexity. As a result, an excessively large number of bits are allocated to a scene with a low coding complexity. Thus in recording a coded bit stream obtained in this manner on a storage medium, an unnecessarily large storage capacity is required compared to that resulting from variable-bit-rate control.

In view of these, the MPEG-2 compression coding technique utilizing the variable-bit-rate control is applied to a digital video disk (DVD) player using an optical disk as a storage medium. According to the conventional techniques, however, a video should be processed through at least two paths, namely, according complexity estimation and coding. That is to say, the conventional variable-bit-rate control cannot be performed in real time, because the complexity of a scene to be recorded should be estimated in advance, and then coding should be performed with an appropriate number of bits allocated depending on the complexity estimated.

SUMMARY OF THE INVENTION

An object of the present invention is providing a variable-bit-rate coding apparatus adapted to convert a video signal into a coded bit stream in real time.

To achieve this object, a coding apparatus according to the present invention includes a compression coder for compression-coding a video signal to output a coded bit stream with a variable bit rate corresponding to a variable number of bits allocated. The apparatus also includes means for calculating a cumulative error by sequentially adding up errors, each representing a difference between a given average target number and a number of bits generated during every predetermined period of the coded bit stream. The apparatus further includes: a coding complexity detector for detecting a coding complexity indicating how difficult to code a scene represented by the video signal is; a change detector for detecting a change of scenes; and a bit allocator. As for a frame just after the change of scenes, the bit allocator determines the allocated bit number by presetting a provisionally allocated bit number based on the coding complexity detected such that a number of bits allocated to a scene with a high coding complexity exceeds the average target number. And if the cumulative error exceeds a predetermined value, the bit allocator corrects the provisionally allocated bit number in accordance with the magnitude of the cumulative error such that the provisionally allocated bit number is reducible to, but not less than, the average target number. As for frames within the same scene on the other hand, the bit allocator sequentially updates a previous value of the allocated bit number such that the cumulative error does not exceed a predetermined maximum value thereof.

The present invention provides a variable-bit-rate coding apparatus for converting a video signal into a coded bit stream in real time. In addition, even if a series of scenes with high coding complexities appear consecutively, a number of bits allocated to each of these scenes can always be at least equal to the average target number, while at the same time the total number of bits generated can be regulated. As a result, high image quality is ensured. Thus, a video signal for a prescribed period of time can be recorded in real time on some storage medium on which a variable rate bit stream is recordable, such as a recordable optical disk like a DVD or a hard disk, with an optimum number of bits allocated based on the residual capacity of the storage medium and the coding complexity of the video signal.

DETAILED DESCRIPTION OF THE INVENTION

Figure 1:
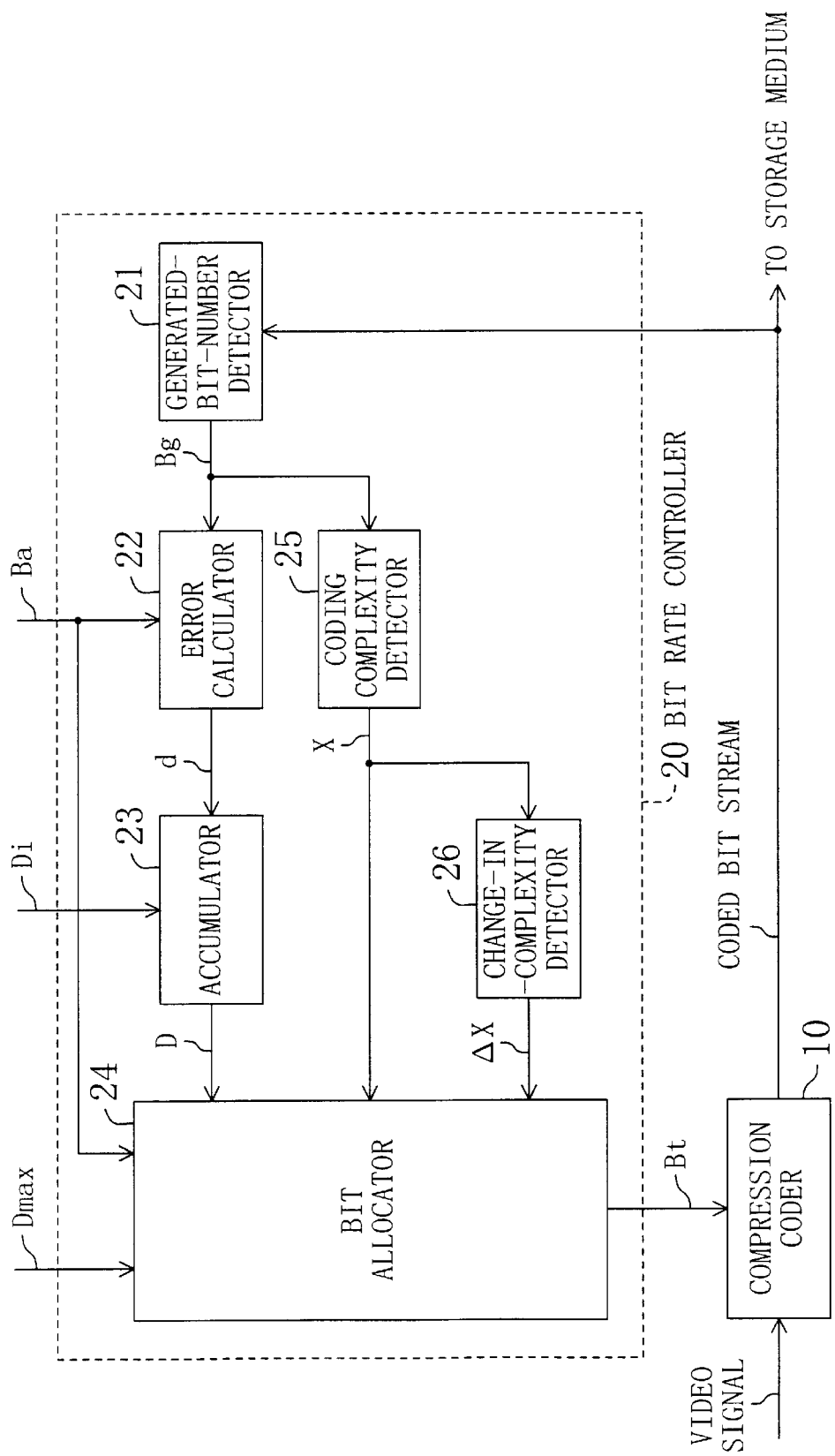
FIG. 1 is a block diagram illustrating an exemplary configuration for a coding apparatus according to the present invention.

FIG. 1 illustrates an exemplary configuration for a variable-bit-rate coding apparatus according to the present invention. The coding apparatus shown in FIG. 1 includes a compression coder 10 and a bit rate controller 20. The compression coder 10 is provided to compression-code a video signal and output a coded bit stream with a variable bit rate corresponding to a variable number Bt of bits allocated. The bit rate controller 20 controls the number of binary bits generated per unit time. The compression coder 10 is adapted to perform MPEG-2 compression coding and includes a DCT converter, a quantizer and a variable-length encoder. The allocated bit number Bt defines a quantization scale for the compression coder 10. The resulting coded bit stream may be recorded on a disk storage medium, for example. The bit rate controller 20 includes: a generated-bit-number detector 21; an error calculator 22; an accumulator 23; a bit allocator 24; a coding complexity detector 25; and a change-in-complexity detector 26. The generated-bit-number detector 21 detects the number Bg of bits generated per unit period of the coded bit stream. The error calculator 22 calculates a difference between the generated bit number Bg detected and a given average target number Ba as an error d. The accumulator 23 adds the error d calculated to a previous cumulative error, thereby obtaining an updated cumulative error D. The bit allocator 24 controls the number Bt of bits allocated to the compression coder 10. The coding complexity detector 25 detects a coding complexity X, which indicates how difficult to code a scene represented by the video signal is, based on the generated bit number Bg. The change-in-complexity detector 26 detects a change of scenes based on a change in coding complexity X. The coding complexity X is calculated based on the generated bit number Bg and the quantization scale. When scenes are changed, a change-in-complexity detection signal ΔX is supplied to the bit allocator 24. The initial and maximum values of the cumulative error are identified by Di and Dmax, respectively. In the illustrated embodiment, a difference between the cumulative error D and the maximum value Dmax thereof is defined as a margin M.

The bit allocator 24 performs feedback control by newly determining the allocated bit number Bt based on the coding complexity X just after the change of scenes and by sequentially updating the previously allocated bit number Bt within the same scene. Specifically, as for a frame just after the change of scenes, the bit allocator 24 determines the allocated bit number Bt by presetting a provisionally allocated bit number Bst such that a number of bits, which are allocated to a relatively complex scene with a coding complexity X exceeding an average complexity Xa, is larger than the average target number Ba. And if the cumulative error D exceeds a predetermined value at this point in time, the bit allocator 24 corrects the provisionally allocated bit number Bst in accordance with the magnitude of the cumulative error D such that the provisionally allocated bit number Bst is reducible to, but not less than, the average target number Ba. However, a number Bt of bits, which are allocated to monotonous scenes with a complexity X lower than the average complexity Xa, is smaller than the average target number Ba. As for frames within the same scene on the other hand, the bit allocator 24 sequentially updates a previously allocated bit number Bt such that the cumulative error D does not exceed the predetermined maximum value Dmax. In this case, the bit allocator 24 determines the updated allocated bit number Bt such that as the cumulative error D approaches the maximum value Dmax, the allocated bit number Bt approximates the average target number Ba.

Figure 2A:
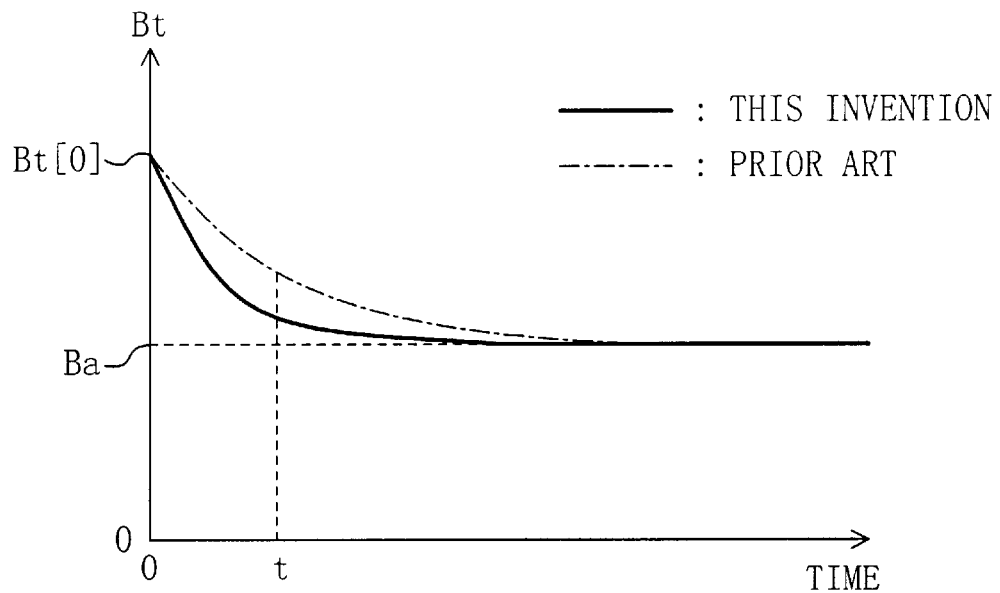
FIGS. 2A and 2B illustrate characteristics of feedback control performed by the coding apparatus shown in FIG. 1 by way of respective variations in allocated bit number Bt and cumulative error D with time.
Figure 2B:
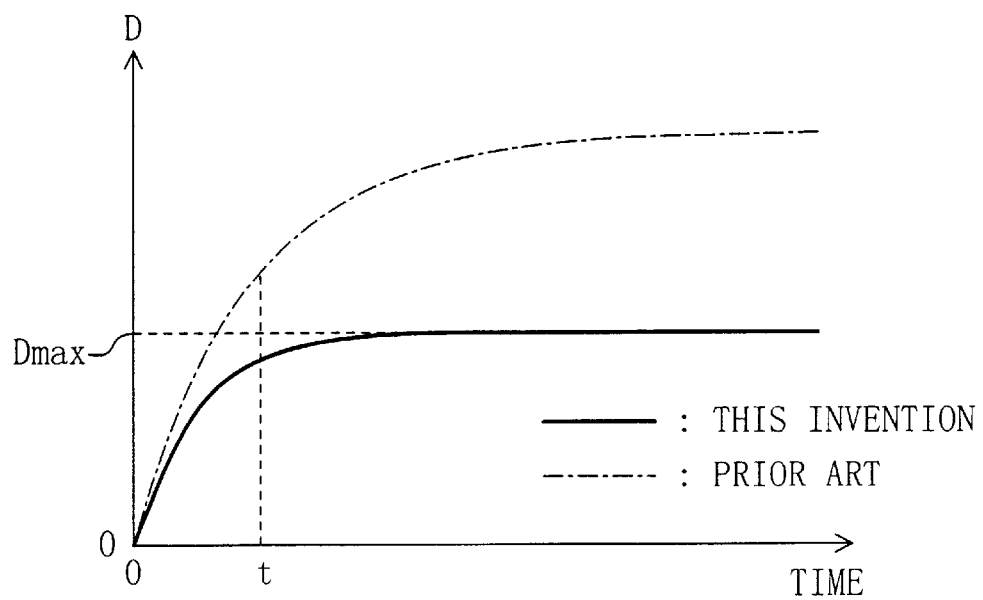

FIGS. 2A and 2B illustrate characteristics of the feedback control performed by the coding apparatus shown in FIG. 1 by way of respective variations in allocated bit number Bt and cumulative error D with time.

The generated bit number Bg is a number of bits generated and defined on a group of picture (GOP) basis, for example. Suppose the number of bits generated in an $n^{th}$ GOP is represented as Bg[n]. In this case, the error d[n], cumulative error D[n], margin M[n] and allocated bit number Bt[n] of the $n^{th}$ GOP are respectively given by $$d[n]=Bg[n]-Ba \quad (1)$$

$$D[n]=D[n-1]+d[n] \quad (2)$$

$$M[n]=D\max-D[n] \quad (3)$$

$$Bt[n]=Bt[n-1]-k\times(Bg[n-1]-Ba) \quad (4)$$

where k is a feedback factor given by $$k=(Bt[0]-Ba)/M \quad (5)$$

According to the present invention, the feedback factor k is variable with the margin M. The rate at which the allocated bit number Bt approximates the average target number Ba differs depending on the margin M and the initially allocated bit number Bt[0].

In FIGS. 2A and 2B, the one dot chains represent the characteristics obtained when the feedback factor k in the Equation (4) is fixed. In such a case, the cumulative error D exceeds the maximum value Dmax thereof. Accordingly, it might be impossible to record a video on a medium with a given capacity for a desired period of time. In contrast, according to the present invention, the cumulative error D never exceeds the maximum value Dmax thereof and the allocated bit number. Bt is never smaller than the average target number Ba at an arbitrary time t. Thus, the present invention ensures that a video is recordable on a medium with a given capacity for a designated period of time. The minimum value Dmin of the cumulative error may be additionally defined to update and control the allocated bit number Bt such that the cumulative error D is not less than the minimum value Dmin.

Figure 3:
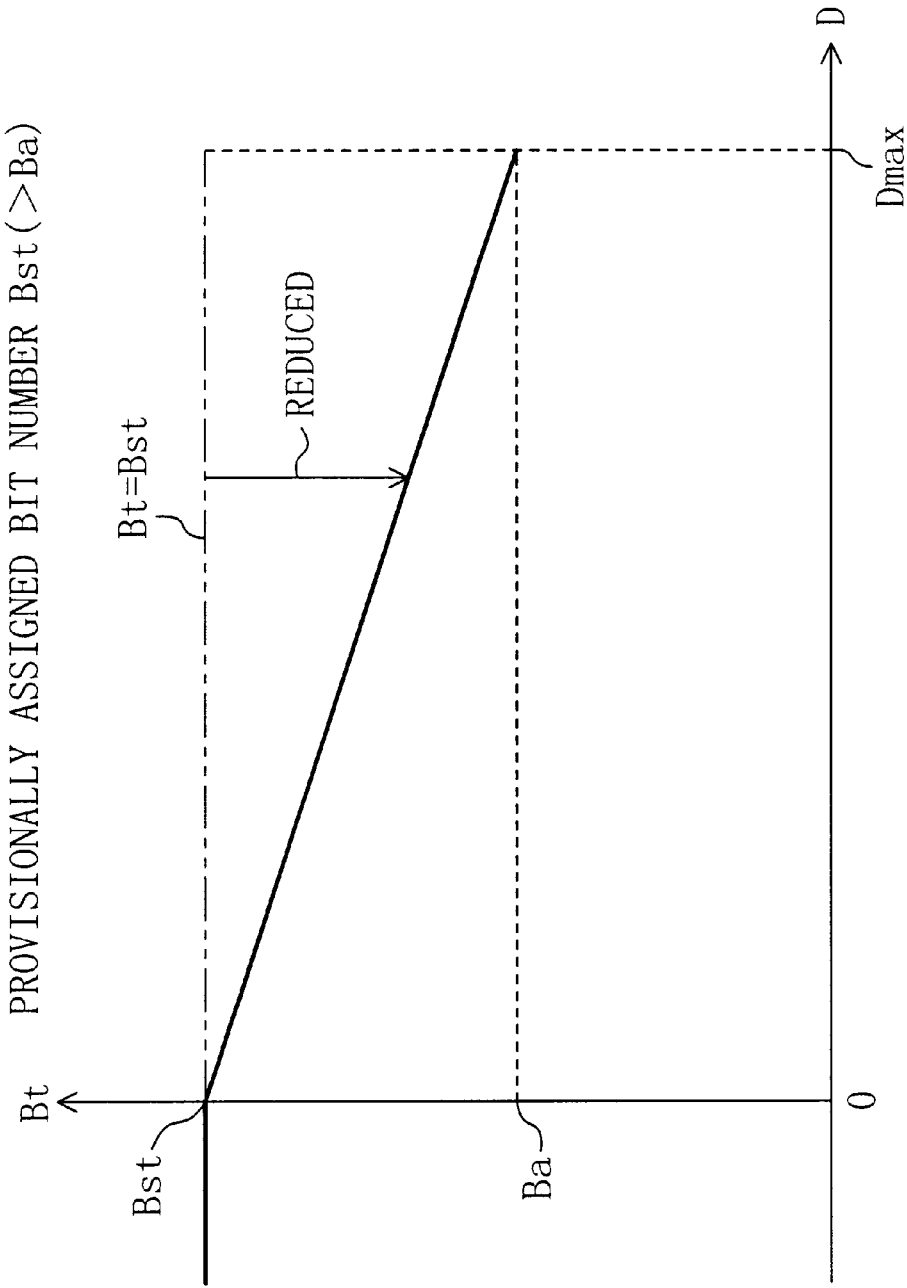
FIG. 3 illustrates how the coding apparatus shown in FIG. 1 corrects the allocated bit number Bt in accordance with the cumulative error D.

FIG. 3 illustrates how the coding apparatus shown in FIG. 1 corrects the allocated bit number Bt in accordance with the cumulative error D. First, the bit allocator 24 presets the provisionally allocated bit number Bst such that a number of bits, which are allocated to a scene with a high coding complexity, exceeds the average target number Ba. If the cumulative error D exceeds a predetermined value (e.g., 0) at this point in time, then the provisionally allocated bit number Bst is corrected in accordance with the magnitude of the cumulative error D so as to be reducible to, but not less than, the average target number Ba. As a result of this correction, the allocated bit number Bt is determined. If the margin M reaches a very large value, a number Bt of bits allocated to a monotonous scene may be at most equal to the average target number Ba.

Figure 4A:
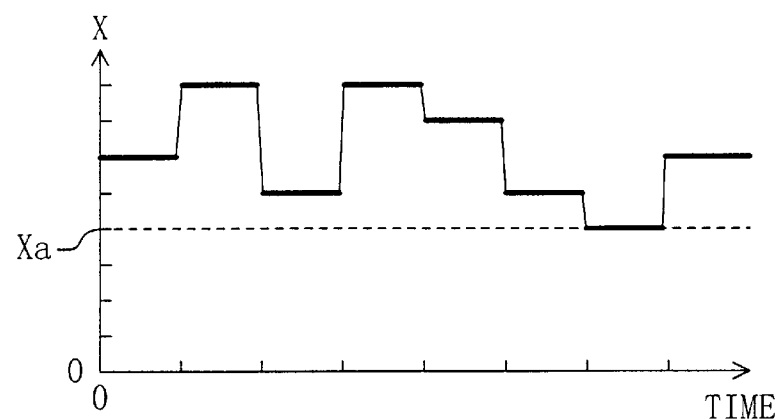
FIGS. 4A, 4B and 4C illustrate an exemplary operation of the coding apparatus shown in FIG. 1 with respect to a series of scenes with high coding complexities by way of respective variations in coding complexity X, allocated bit number Bt and cumulative error D with time.
Figure 4B:
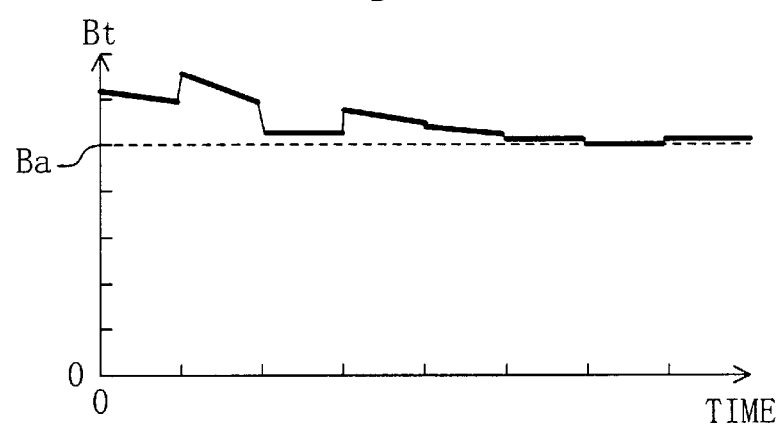
Figure 4C:
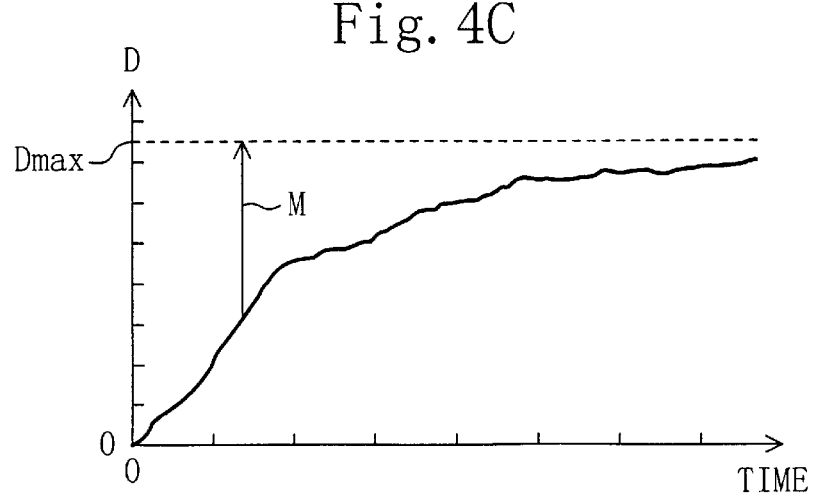

FIGS. 4A, 4B and 4C illustrate an exemplary operation of the coding apparatus shown in FIG. 1 with respect to a series of scenes with high coding complexities by way of respective variations in coding complexity X, allocated bit number Bt and cumulative error D with time. In the illustrated example, the initial cumulative error Di is set equal to zero, i.e., an initial margin Mi is set equal to the maximum cumulative error Dmax. As shown in FIGS. 4A, 4B and 4C, since the margin M is large enough for some time after the start of coding, the allocated bit number Bt is set larger than the average target number Ba in accordance with the coding complexity X. However, the allocated bit number Bt gradually decreases as there is smaller and smaller margin M left. And then when the cumulative error D reaches the maximum value Dmax thereof, i.e., the margin M reaches zero. Thereafter, only the average target number Ba of bits are allocated to even a scene with a high coding complexity X. That is to say, the total number of bits never exceeds a predetermined value. Thus, it is possible to ensure that recording is performed for a desired period of time. In addition, even after the margin M has reached zero, an image quality, which is equal to that attained by fixed-bit-rate control, is still ensured.

Figure 5A:
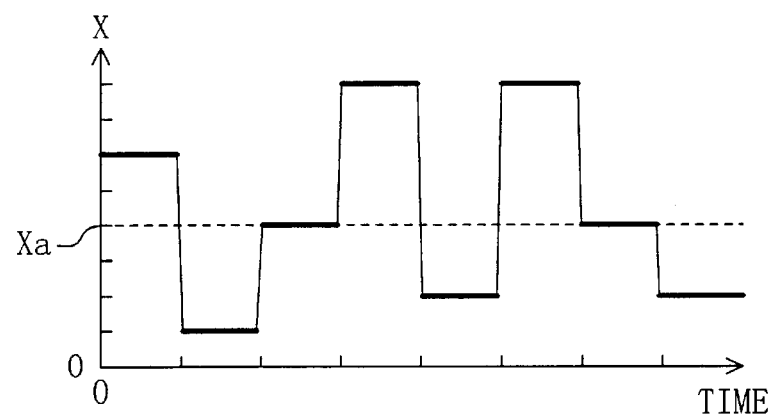
FIGS. 5A, 5B and 5C illustrate another exemplary operation of the coding apparatus shown in FIG. 1 with respect to a mixture of scenes with high and low coding complexities by way of respective variations in coding complexity X, allocated bit number Bt and cumulative error D with time.
Figure 5B:
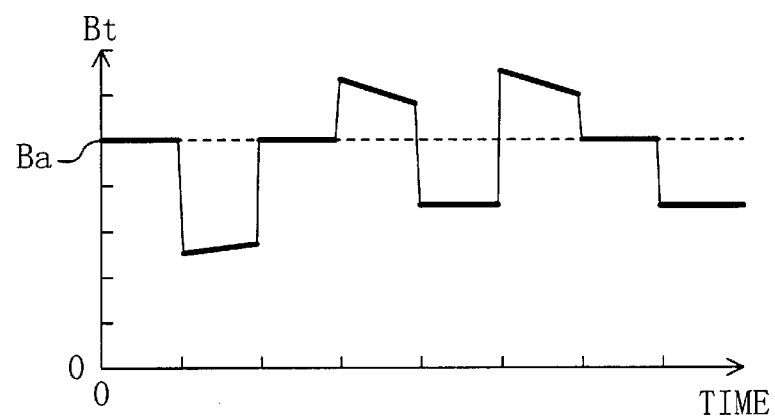
Figure 5C:
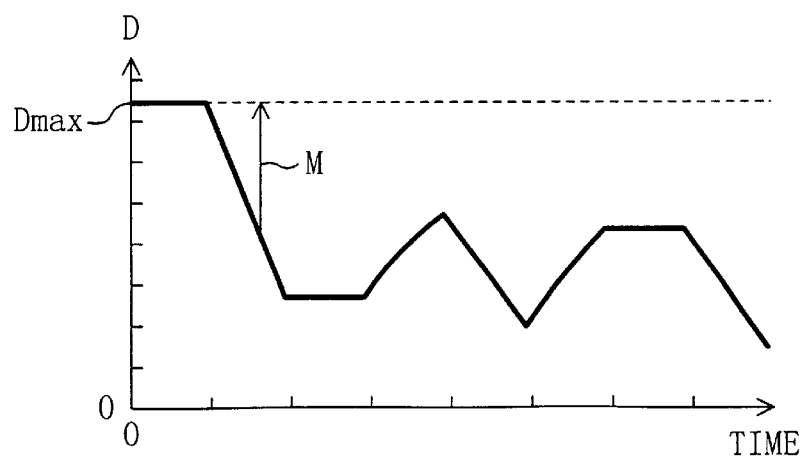

FIGS. 5A, 5B and 5C illustrate another exemplary operation of the coding apparatus shown in FIG. 1 with respect to a mixture of scenes with high and low coding complexities by way of respective variations in coding complexity X, allocated bit number Bt and cumulative error D with time. In the illustrated example, the initial cumulative error Di is set equal to the maximum cumulative error Dmax, i.e., the initial margin Mi is set equal to zero. As shown in FIGS. 5A, 5B and 5C, since there is no margin M when coding is started, only the average target number Ba of bits are allocable to even a scene with a high coding complexity X. Thereafter, a number Bt of bits, which are allocated to a scene with a low coding complexity X, is set smaller than the average target number Ba. As a result, the cumulative error D decreases, i.e., the margin M is accumulated. Accordingly, when a scene with a high coding complexity X appears the next time, a sufficient number of bits are allocable by extracting the margin M accumulated. In this manner, as for a common video as a mixture of scenes with high and low coding complexities, the margin M is accumulated and consumed in such a manner as to strike an adequate balance. As a result, variable-bit-rate control can be performed in accordance with the coding complexities X of individual scenes.

The initial cumulative error Di may be determined based on a time Tv [minutes] for which a coded bit stream will be expectedly recorded on a storage medium. In this example, a recording rate will be represented as Rv [bps]. For example, (1) If the expected recording time Tv is less than 30 minutes, $$Dmax = Rv \times 30 \text{ [minutes]} \times 0.05 \quad (6)$$

$$Mi = Rv \times Tv \times 0.05 \quad (7)$$

$$Rva = Rv \times 0.95 \quad (8)$$

$$Di = Rv \times (30 \text{ [minutes]} - Tv) \times 0.05 \quad (9)$$

where Rva is an average target rate corresponding to the average target number Ba; and (2) If the expected recording time Tv is equal to or longer than 30 minutes, $$Dmax = Rv \times 30 \text{ [minutes]} \times 0.05 \quad (10)$$

$$Mi = Dmax \quad (11)$$

$$Rva = Rv - Mi/Tv \quad (12)$$

$$Di = 0 \quad (13)$$

If the expected recording time Tv is not clear (i.e., if this is not reserved recording), then the expected recording time Tv is defined at a maximum recordable time, which is calculated from the residual capacity of a storage medium. However, the maximum recordable time may be limited to 60 minutes, for example.

In the foregoing embodiment, the MPEG-2 compression coding technique is supposed to be applied to the compression coder 10 shown in FIG. 1. Alternatively, any other compression coding technique is applicable as well. Also, part of all of the functions to be performed by the bit rate controller 20 shown in FIG. 1 is implementable by means of software.

Moreover, in the foregoing embodiment, the coding complexity X is supposed to be detected based on the generated bit number Bg. Optionally, a spatial level variation of an input video signal or a level variation between frames with time may also be detected as the coding complexity. Furthermore, in the foregoing embodiment, the change of scenes is supposed to be detected in accordance with the variation in coding complexity X. Alternatively, when interframe predictive coding is performed, for example, the scene change may be detected based on a sum of absolute or squared values of predictive error signals.

What is claimed is:

1. A coding apparatus comprising:

a compression coder for compression-coding a video signal to output a coded bit stream with a variable bit rate corresponding to a variable allocated bit number;

means for calculating a cumulative error by sequentially adding up errors, each representing a difference between a given average target number and a number of bits generated during every predetermined period of the coded bit stream; and a bit allocator for updating and controlling the variable allocated bit number such that the cumulative error does not exceed a predetermined maximum value thereof;

wherein the bit allocator determines the updated value of the allocated bit number such that as the cumulative error approximates the maximum value, the allocated bit number approximates the average target number.

2. A coding apparatus comprising:

a compression coder for compression-coding a video signal to output a coded bit stream with a variable bit rate corresponding to a variable allocated bit number;

means for calculating a cumulative error by sequentially adding up errors, each representing a difference between a given average target number and a number of bits generated during every predetermined period of the coded bit stream; said means for calculating including a generated-bit-number detector for detecting the number of bits generated from the coded bit stream; an error calculator for calculating a difference between the generated bit number detected and the average target number as an error; and an accumulator for adding the error calculated to a previous value of the cumulative error, thereby obtaining an updated value of the cumulative error; and a bit allocator for updating and controlling the variable allocated bit number such that the cumulative error does not exceed a predetermined maximum value thereof;

wherein an initial value of the cumulative error is determined for the accumulator in accordance with a time expectedly taken to record the coded bit stream on a storage medium.

3. A coding apparatus comprising:

a compression coder for compression-coding a video signal to output a coded bit stream with a variable bit rate corresponding to a variable number of bits allocated;

means for calculating a cumulative error by sequentially adding up errors, each representing a difference between a given average target number and a number of bits generated during every predetermined period of the coded bit stream;

a coding complexity detector for detecting a coding complexity indicating how difficult to code a scene represented by the video signal is; and a bit allocator for determining the allocated bit number by presetting a provisionally allocated bit number based on the coding complexity detected such that a number of bits allocated to a scene with a high coding complexity exceeds the average target number and by correcting the provisionally allocated bit number in accordance with the magnitude of the cumulative error such that the provisionally allocated bit number is reducible to, but not less than, the average target number if the cumulative error exceeds a predetermined value.

4. The apparatus of claim 3, wherein the bit allocator determines the allocated bit number such that a number of bits, which are allocated to a scene with a low coding complexity, is smaller than the average target number.

5. The apparatus of claim 3, wherein the calculating means comprises:
a generated-bit-number detector for detecting the number of bits generated from the coded bit stream;
an error calculator for calculating a difference between the generated bit number detected and the average target number as an error; and
an accumulator for adding the error calculated to a previous value of the cumulative error, thereby obtaining an updated value of the cumulative error.

6. The apparatus of claim 5, wherein the coding complexity detector detects the coding complexity based on the generated bit number detected by the generated-bit-number detector.

7. The apparatus of claim 5, wherein an initial value of the cumulative error is determined for the accumulator in accordance with a time expectedly taken to record the coded bit stream on a storage medium.

8. A coding apparatus comprising:
a compression coder for compression-coding a video signal to output a coded bit stream with a variable bit rate corresponding to a variable number of bits allocated;
means for calculating a cumulative error by sequentially adding up errors, each representing a difference between a given average target number and a number of bits generated during every predetermined period of the coded bit stream;
a coding complexity detector for detecting a coding complexity indicating how difficult to code a scene represented by the video signal is;
a change detector for detecting a change of scenes; and
a bit allocator for determining the allocated bit number for a frame just after the change of scenes by presetting a provisionally allocated bit number based on the coding complexity detected such that a number of bits allocated to a scene with a high coding complexity exceeds the average target number and by correcting the provisionally allocated bit number in accordance with the magnitude of the cumulative error such that the provisionally allocated bit number is reducible to, but not less than, the average target number if the cumulative error exceeds a predetermined value, and for sequentially updating a previous value of the allocated bit number for frames within the same scene such that the cumulative error does not exceed a predetermined maximum value thereof.

9. The apparatus of claim 8, wherein the bit allocator determines the allocated bit number such that a number of bits, which are allocated to a scene with a low coding complexity, is smaller than the average target number.

10. The apparatus of claim 8, wherein the bit allocator determines the updated value of the allocated bit number such that as the cumulative error approximates the maximum value, the allocated bit number approximates the average target number.

11. The apparatus of claim 8, wherein the calculating means comprises:
a generated-bit-number detector for detecting the number of bits generated from the coded bit stream;
an error calculator for calculating a difference between the generated bit number detected and the average target number as an error; and
an accumulator for adding the error calculated to a previous value of the cumulative error, thereby obtaining an updated value of the cumulative error.

12. The apparatus of claim 11, wherein the coding complexity detector detects the coding complexity based on the generated bit number detected by the generated-bit-number detector.

13. The apparatus of claim 12, wherein the change detector detects the change of scenes based on a variation in the coding complexity detected by the coding complexity detector.

14. The apparatus of claim 11, wherein an initial value of the cumulative error is defined at the maximum value for the accumulator.

15. The apparatus of claim 11, wherein an initial value of the cumulative error is determined for the accumulator in accordance with a time expectedly taken to record the coded bit stream on a storage medium.

* * * * *